United States Patent
Lee et al.

(10) Patent No.: US 8,590,506 B2
(45) Date of Patent: Nov. 26, 2013

(54) COMPRESSION IGNITION GASOLINE ENGINE

(75) Inventors: Ju Hun Lee, Gwangmyung-si (KR); Jeong Hwa Cha, Hwaseong (KR); Jin-Kook Kong, Suwon (KR); Young Nam Kim, Seongnam (KR)

(73) Assignee: Hyundai Motor Company, Seoul (KR)

(*) Notice: Subject to any disclaimer, the term of this patent is extended or adjusted under 35 U.S.C. 154(b) by 795 days.

(21) Appl. No.: 12/842,442

(22) Filed: Jul. 23, 2010

(65) Prior Publication Data
US 2011/0108001 A1 May 12, 2011

(30) Foreign Application Priority Data
Nov. 12, 2009 (KR) .................. 10-2009-0109303

(51) Int. Cl.
*F02B 1/12* (2006.01)
*F02D 19/08* (2006.01)

(52) U.S. Cl.
USPC ................ 123/305; 123/90.15; 123/299

(58) Field of Classification Search
USPC .......... 123/305, 300, 299, 295, 90.15, 90.11; 701/103–105
See application file for complete search history.

(56) References Cited

U.S. PATENT DOCUMENTS

| | | | | |
|---|---|---|---|---|
| 6,425,367 | B1 * | 7/2002 | Hiraya et al. ............... | 123/305 |
| 6,640,771 | B2 * | 11/2003 | Fuerhapter ................. | 123/295 |
| 7,275,514 | B2 * | 10/2007 | Kuo et al. .................. | 123/299 |

* cited by examiner

*Primary Examiner* — Hieu T Vo
(74) *Attorney, Agent, or Firm* — Morgan, Lewis & Bockius LLP (57) ABSTRACT

A compression ignition gasoline engine uses low-cetane number fuel, such as gasoline. The engine includes a combustion control device having an injector directly injecting fuel into a combustion chamber, intake and exhaust valves, and a variable valve device changing a valve timing, in which the compression ignition gasoline engine includes: at least two intake valves and two exhaust valves; a spark plug positioned at the center portion of the combustion chamber; and an injector positioned adjacent to the spark plug toward the center portion of the combustion chamber, in which the exhaust valve is a symmetric valve lift in which the lift and the opening section of the tow exhaust valves are the same in low lift, and the intake valve is an asymmetric valve lift in which the lift and the opening of the two intake valves are different in the low lift.

13 Claims, 6 Drawing Sheets

COMPRESSION IGNITION GASOLINE ENGINE

CROSS-REFERENCE TO RELATED APPLICATION

This application claims priority to and the benefit of Korean Patent Application No. 10-2009-0109303 filed in the Korean Intellectual Property Office on Nov. 12, 2009, the entire contents of which are incorporated herein by reference.

BACKGROUND OF THE INVENTION

1. Field of the Invention

The present invention relates to a gasoline engine. More particularly, the present invention relates to a compression ignition gasoline engine using low-cetane number fuel, such as gasoline.

2. Description of the Related Art

In general, a gasoline direct injection engine equipped with a solenoid-typed in-ward injector and two-stage variable valve lift for maximizing the internal ERG is applied to gasoline Controlled Auto Ignition (CAI) engines in order to generate self-ignition, and the fuel is injected one time in a recompression process or two times in the recompression process and an intake process.

In the two-time injection, as compared with the single injection, the fuel efficiency is considerably improved and the combustion pressure ascension rate (dp/dθ) is low in accordance with load conditions; however, the combustion pressure ascension rate (dp/dθ) is relatively large, at 4 bar/deg or more, without a difference above predetermined load.

The combustion pressure ascension rate (dp/dθ) represents a rapid raise of combustion pressure and is used as an index indicating representation of combustion noise.

The increase of the rate significantly increases the noise level that a driver feels and causes a problem in engine durability.

For reference, comparing with the compression ignition diesel engine, in terms of combustion noise level, the combustion pressure ascension rate (dp/dθ) of common diesel engines is about 2-3 bar/deg, and about 4-5 bar/deg when the maximum output is required. Accordingly, it can be seen that the level of combustion pressure ascension rate (dp/dθ) of current gasoline CAI engines is very high.

The fuel injection method for implementing a gasoline CAI is divided into an MPI type that injects fuel to the intake port and a direct injection type that directly injects fuel into the cylinder.

The MPI type was applied in the earlier state of development, but recently, the direct injection type that makes it possible to inject fuel in various ways is developed.

The injector used for the direction injection type is a solenoid-typed in-ward injector, which has a structure in which an injector pintle moves up in the injector in fuel injection and the fuel is injected through a hole formed through the injector.

The injector is disposed at the center of the combustion chamber under the intake port, which is a center injection type.

The center injection type has the advantage of minimizing that the fuel injected in the recompression process hits against the upper portion of the piston.

However, since the solenoid-type injector is small in injection rate, 14-15 g/sec, the number of multiple injection is limited when it is required to inject the fuel several times for a short time, and particularly, it may cause a problem, such as coaking.

Since the gasoline CAI engine basically uses self-ignition for combustion, combustion is generated simultaneously at several positions in the combustion chamber.

In this case, unburned fuel generates soot and the injection hole of the injector is clogged with the soot. This phenomenon is referred to as coking.

The coking makes wrong changes in the injection amount and shape of the injector, and as a result, the combustion becomes unstable and the engine fails.

Therefore, it is impossible to perform compression process injection that generates combustion by a limit in selection of injection time due to the problem and it is also difficult to perform multiple injection above two times.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a compression ignition gasoline engine having advantages of achieving stable compression ignition and reducing combustion noise by using multi-stage injection and multiple ignition.

An exemplary embodiment of the present invention provides a compression ignition gasoline engine that includes a combustion control device having an injector directly injecting fuel into a combustion chamber, intake and exhaust valves, and a variable valve device changing a valve timing, in which the compression ignition gasoline engine includes: at least two intake valves and two exhaust valves; a spark plug positioned at the center portion of the combustion chamber; and an injector positioned adjacent to the spark plug toward the center portion of the combustion chamber, in which the exhaust valve is a symmetric valve lift in which the lift and the opening section of the two exhaust valves are the same in low lift, and the intake valve is an asymmetric valve lift in which the lift and the opening of the two intake valves are different in the low lift.

Further, the intake valves move by the same valve lift in a spark ignition mode in ignition for an explosion stroke with spark generated by the spark plug disposed in the combustion chamber, and one of the intake valves move by a less valve lift than the other intake valve in a self-ignition mode in which self-ignition for the explosion stroke is processed in the combustion chamber.

Further, in the self-ignition mode, the lift start time of any one of the intake valves is later than the lift start time of the other intake valve and the closing time of the intake valves is the same.

Further, in the self-ignition mode, the lift maximum time of any one of the intake valves and the lift maximum time of the other intake valve are the same.

Further, the exhaust valve has the less amount of lift in the spark ignition mode than in the self-ignition mode.

Further, the closing time of the exhaust valve is earlier in the self-ignition mode than the spark ignition mode.

Further, the compression ignition gasoline engine has a section (under lap section) in which the intake valve opens after a predetermined time, with the exhaust valve closed in the self-ignition mode.

Further, fuel is separately injected from the injector for several times, at least one time or more, in Negative valve overlap (NVO), intake, and compression processes, in accordance with the operation region.

Further, the spark plug reduces combustion noise by controlling the time of self-ignition due to the earlier flame propagation and restricting a combustion pressure ascension rate, with an ignition assist type using multiple ignition.

Further, the injector is an outward type in which a pintle therein moves outside.

Further, the valve timing is controlled by applying continuous variable valve timing (CVVT) to the intake and exhaust valves, thereby adjusting the internal EGR rate.

Further, the piston has a semicircular or flat groove with a predetermined inclination at the center portion, for center direct injection.

As described above, according to a compression ignition gasoline engine according to the present invention, it is possible to suppress excessive self-ignition and rapid increase of combustion noise, thereby reducing combustion noise, by using multiple injection, multiple injection, particularly injecting fuel in the compression process to drop temperature and pressure of the air-fuel mixture.

Further, it is possible to reduce fuel consumption and emission, and also reduce combustion pressure ascension rate and combustion noise, by inducing flame propagation in the earlier state to stabilize the combustion, through a spark assistant using single ignition or multiple ignition to remove unstable combustion due to excessive suppress of self-ignition.

Further, it is possible to prevent coking generated in the compression process, using an out-ward type high-flow rate injector.

Further, it is possible to appropriately control self-ignition, using ignition of a gasoline engine.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
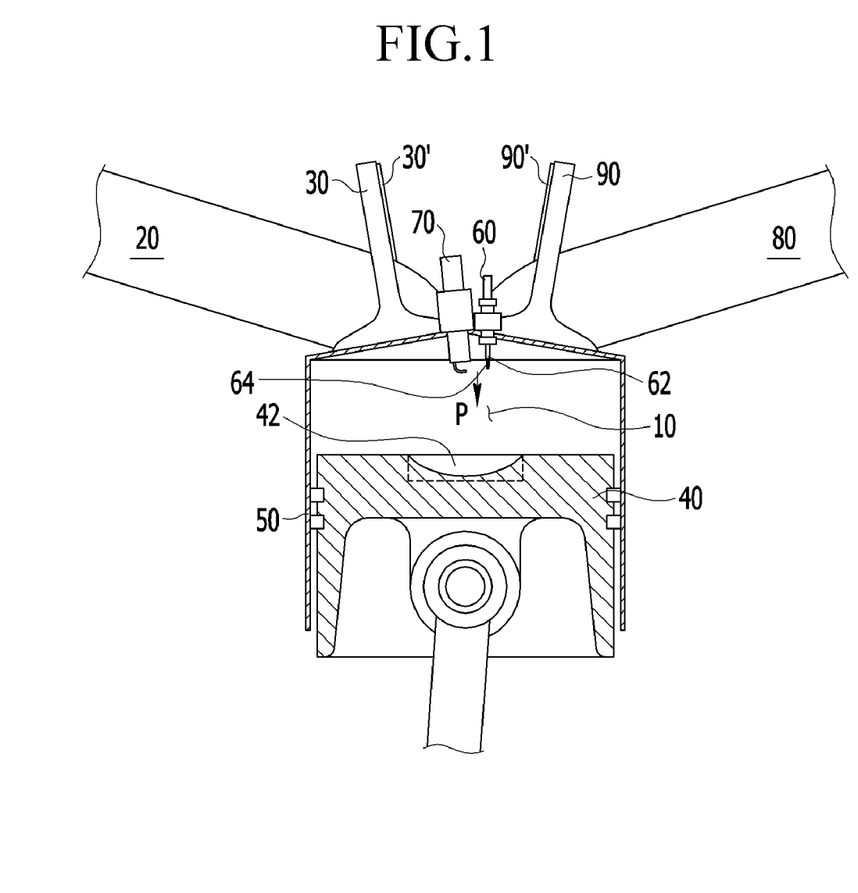
FIG. 1 is a cross-sectional view showing an exemplary compression ignition gasoline engine according to the present invention.

A compression ignition gasoline engine according to various embodiments of the present invention, as shown in FIG. 1, includes a combustion chamber 10, at least a pair of intake ports 20, an intake valve 30 positioned at the inlet of the combustion chamber 10 in the downstream of the intake port 20, a piston 40, a cavity 42 formed at the center portion on the top of the piston 40, an injector 60 disposed at the center portion of the cylinder and directly injecting fuel in the axial direction of each cylinder, spark plug 70, an electronic control unit (referred to as ECU) controlling combustion, at least a pair of exhaust ports 80, and an exhaust valve 90 disposed at the outlet of the combustion chamber 10 in the upstream of the exhaust port 80.

In this configuration, two intake valves 30 and exhaust valves 90 are provided, respectively. For example, intake valve 30 and exhaust valve 90 is clearly shown in FIG. 1, while intake valve 30' and exhaust valve 90' are adjacent but largely hidden from view. one will appreciate that the two intake valves may be identical to one another, or modified from one another, as is the case with the exhaust valves.

The ECU checks whether to reach a condition where compression ignition combustion is possible, using a coolant temperature sensor or an oil temperature sensor, and determines to perform the operation in any one of compression ignition combustion and spark ignition combustion types, on the basis of an engine rotation signal detected by a crank angle sensor (not shown) and an accelerator opening signal detected by an accelerator opening sensor (not shown).

The injector 60 is formed with the injection hole 62 protruding through the center portion of the top of the combustion chamber 10 and the cavity 42 depressed on the top of the piston 40 is formed in consideration of the injection direction of the injector 60. The cavity or recessed groove may be semicircular as shown in FIG. 1, or may be a flat groove as shown in phantom in FIG. 1.

In this configuration, a knocking sensor (not shown) or a coolant temperature sensor (not shown) may be further included.

Since the spark plug and the injector are positioned at the center portion of the combustion chamber, which is a center direct injection engine, it is possible to minimize wall wetting of the piston, as compared with a method of injecting fuel from the sides, in selecting injection time.

Further, the injector 60 is an out-ward type high-flow rate injector (27-32 g/sec) in which a pintle 64 moves outward from the inside as indicated by arrow "P" in FIG. 1, thereby preventing coking.

Further, the intake and exhaust valves are equipped with a valve train having a two stage variable structure of a swing arm type or a direct-acting type to ensure sufficient an EGR rate.

Further, a variable mechanism is further included to change the lift amount and lift timing of the valves.

The variable member, a two stage variable mechanism, controls differently the lift and opening sections of the intake and exhaust valves.

That is, the variable mechanism is controlled by the ECU and the components of the ECU can be implemented by a program of a microcomputer.

Furthermore, in various embodiments of the present invention, the gas mixture of fuel and gas produced in the cylinder is self-ignited, and ignited by the spark plug 70 when the revolution speed of the engine is lower than a predetermined value.

To be more specific, a spark ignition mode, a self-ignition mode, or a spark assistant self-ignition mode is selectively performed by the ECU.

That is, combustion is made by spark generated by operating the spark plug in the spark ignition mode, and a combustion (expansion) stroke is performed by self-ignition of gas mixture by the pressure and temperature inside the cylinder in the self-ignition mode or the spark assistant self-ignition mode; however, in a section where excessive combustion pressure is possibly generated, excessive combustion pressure increase is reduced by injecting fuel in the compression process to reduce the temperature and pressure in the combustion chamber and prevent self-ignition, in which the combustion is stabilized by operating a single or multiple spark plugs to remove unstable combustion due to prevention of the excessive self-ignition.

Figure 2:
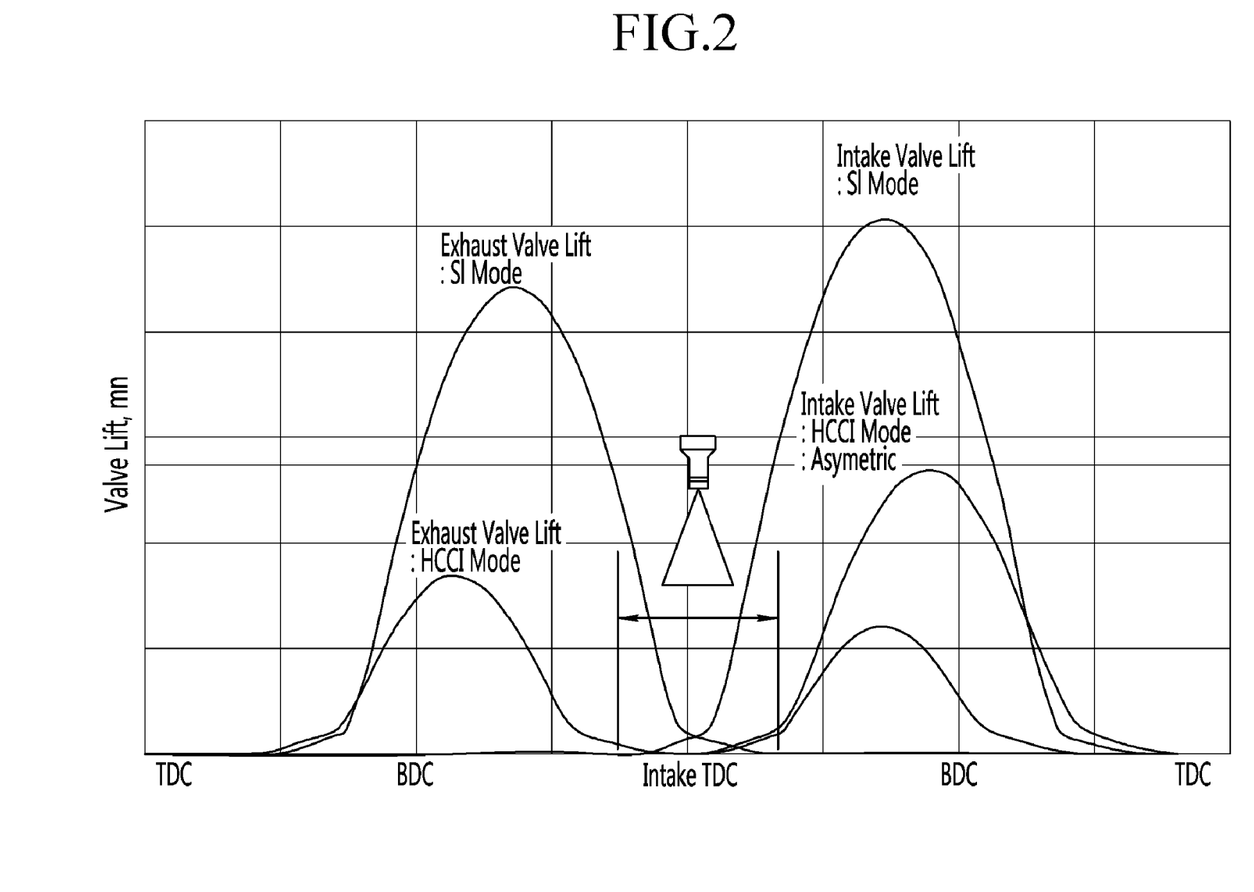
FIG. 2 is a graph showing the result of single injection of an exemplary compression ignition gasoline engine according to the present invention.

Referring to FIG. 2, the spark ignition mode is indicated by spark ignition (SI) mode' and the self-ignition mode is indicated by homogeneous charge compression ignition (HCCI) mode or spark assistant self-ignition mode.

Further, in order to accurately control the internal EGR rate, the valve timing is adjusted by a CVVT that can adjust intake and exhaust valve timing. As shown in FIGS. 2 to 5, excessive self-ignition is prevented by injecting fuel several times (three or more times) through multi-stage injection in the NVO, intake, and compression processes, such that compression ignition and compression noise are reduced. Further, the self-ignition due to the development of flame in the first half of the combustion is suppressed by performing multi-combustion in the compression process, and stable self-ignition is induced by inducing self-ignition in the latter half of the combustion.

FIG. 2 is a graph showing the result of single injection of a compression ignition gasoline engine according to various embodiments of the present invention.

The single injection is the most basic injection condition for generating self-ignition of gasoline, in which injection is finished about the recompression process in an under-lap section, which is a section before the intake valve opens from when the exhaust valve closes.

In the single injection, the injection time is set between BTDC 70° and ATDC 60° under Intake TDC standard.

Figure 3:
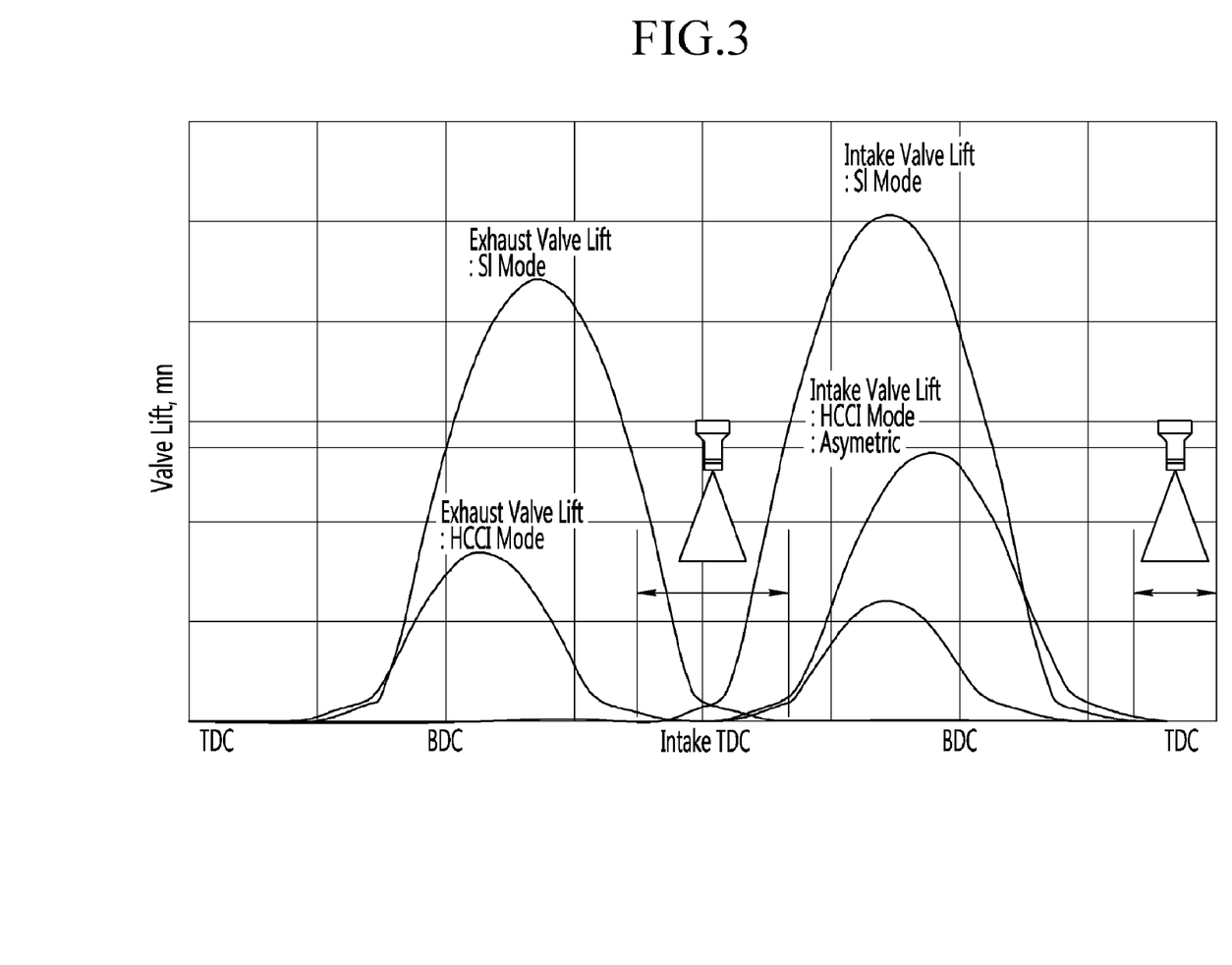
FIG. 3 is a graph of injection time in two-time injections of an exemplary compression ignition gasoline engine according to the present invention.

FIG. 3 shows injection time in two-injections, in which the first injection is set between BTDC 70° and ATDC 60° under intake TDC standard and the second injection is set between BTDC 60° and BTDC 20° under compression TDC standard.

The second injection has the most combustion noise reduction level around BTDC 30° under compression TDC standard, but this value becomes an advance angle or a delay angle in accordance with engine load, and the combustion noise is reduced by increasing the amount of fuel for the second injection in dividing the fuel for the first and second injections.

Figure 4:
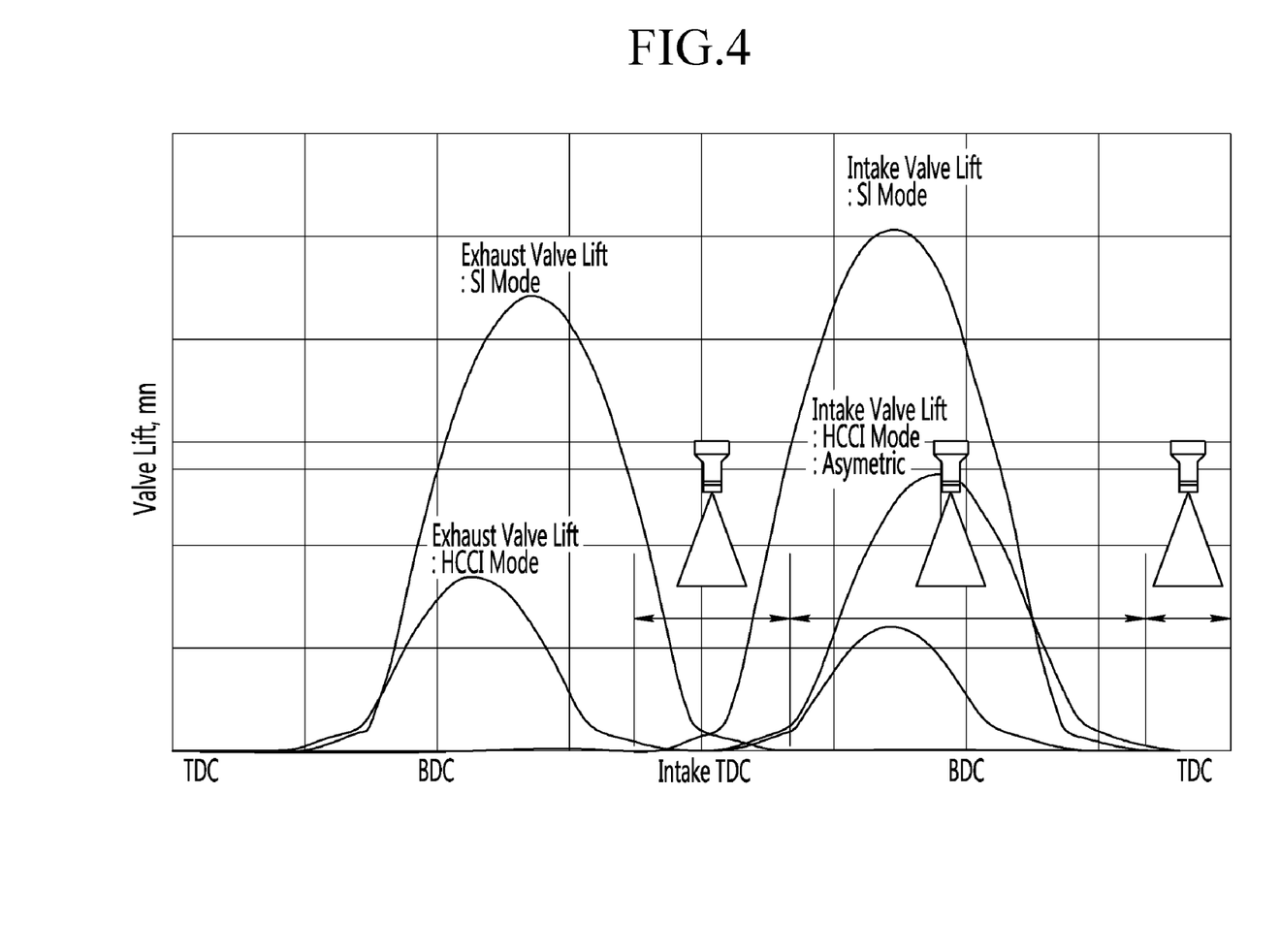
FIG. 4 is a graph of injection time in three-time injections of an exemplary compression ignition gasoline engine according to the present invention.

FIG. 4 shows injection time in three-time injections, in which the first injection is set between BTDC 70° and ATDC 20° under Intake TDC standard, the second injection is set between ATDC 20° and before 0.5 ms from the start of the third injection under intake TDC standard, and the third injection is set between BTDC 50°-BTDC 20°.

The third injection time is set close to compression TDC to suppress the self-ignition. When the amount of second injection increases in the entire fuel injection amount, the fuel efficiency is improved, but the combustion pressure ascension rate (dp/dθ) increases.

Figure 5:
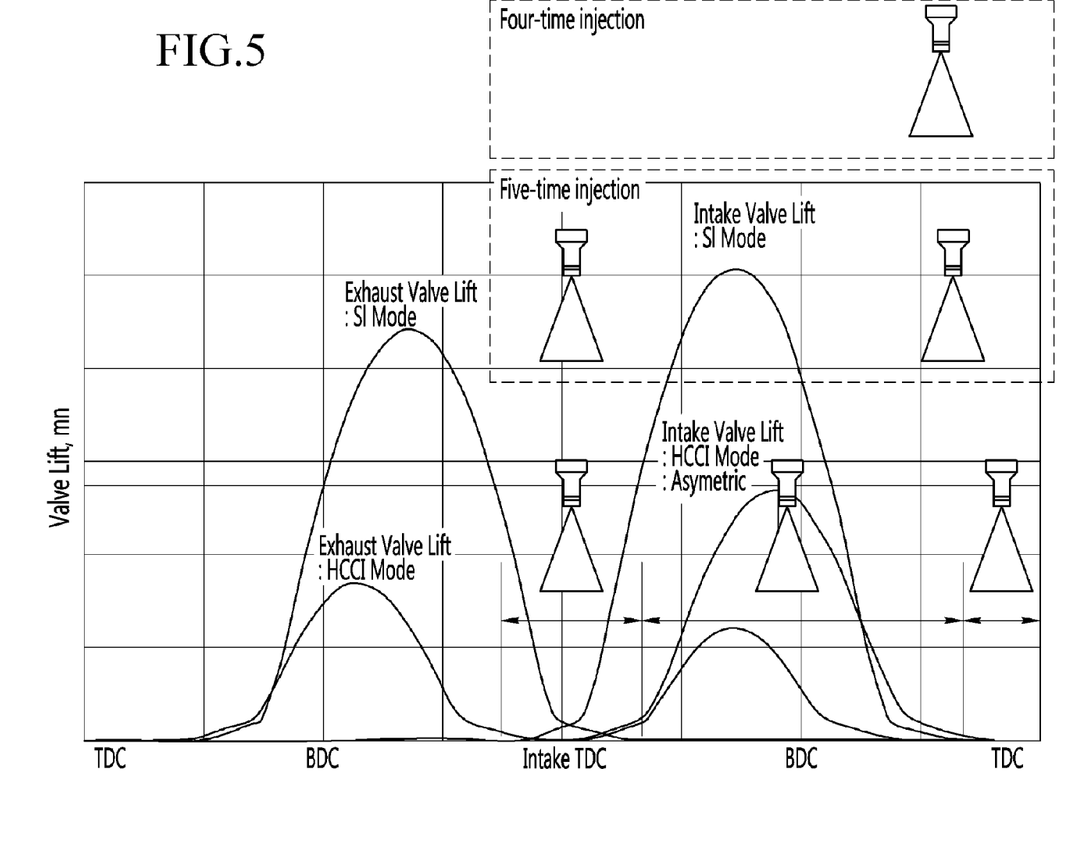
FIG. 5 is a graph of injection time in four-time to five-time injections of an exemplary compression ignition gasoline engine according to the present invention.

FIG. 5 is a graph of injection time in four-time to five-time injections.

The four-time injections are implemented by adding single injection to the three-time injections and the injection time is possible until before compression TDC after the exhaust valve closes.

The injection is performed close to compression TDC to suppress self-ignition and the injection time is set close to intake TDC to improve the self-ignition.

The five-time injections, similar to the four-time injections, is performed to adjust the combustion pressure ascension rate (dp/dθ) by adding two-time injections to the three-time injections, and possible until before compression TDC after the exhaust valve closes.

It is preferable to perform injection close to compression TDC in order to reduce combustion pressure ascension rate (dp/dθ).

In the multiple injection, the injection time and amount are determined in consideration of the response of the injection and the calculation ability of the ECU.

On the other hand, describing the operation of the exhaust valve 90 with reference to FIG. 2 to FIG. 5, the lift amount of the exhaust valve 90 is smaller in the self-ignition mode than the amount of lift in the spark ignition mode, and the closing time of the exhaust valve 90 in the self-ignition mode is faster than that in the spark ignition mode.

That is, the exhaust valve 90 opens a little in the self-ignition mode and closes early.

Describing the operation of the intake valve 30, the lift amount of the intake valve 30 is smaller in the self-ignition mode than the lift amount in the spark ignition mode.

That is, the intake valve 30 is divided into a first intake valve and a second intake valve, and the lift amount of the first intake valve and the second intake valve is the same in the spark ignition mode.

However, in the self-ignition mode, the lift amount of the second intake valve is smaller than the lift amount of the first intake valve. Further, the opening time of the second intake valve is later than the opening time of the first intake valve. That is, the second intake valve opens later and less than the first intake valve.

As described above, by controlling differently the lift amount and the opening time of the first intake valve and the second intake valve, the flow rate inside the cylinder is improved and uniform gas mixture is produced, such that it is possible to improve stability of the self-ignition.

Further, the under-lap section is generated between when the exhaust valve closes and when the second intake valve closes in the self-ignition mode, in which the under-lap section implies when at least any ones of the exhaust valves and the intake valves simultaneously have closed.

The temperature and the pressure inside the combustion chamber should be increased to generate self-ignition in a gasoline engine, and for this purpose, underlap (e.g., negative valve overlap) that closes early the exhaust valve is generally used to maximize the internal EGR rate. In this case although it is possible to generate stable self-ignition by ensuring sufficient EGR rate under low load, when the load increases, self-ignition is generated by excessive internal EGR rate and the combustion pressure rapidly increases, such that the combustion noise rapidly increases and the durability of the engine is also affected.

Further, controlling differently the amount of lift and the opening/closing time of the first intake valve and the second intake valve is called an asymmetric valve lift.

In various embodiments of the present invention, the reference discriminating the self-ignition mode from the spark ignition mode may be the revolution speed and load conditions of the engine, and coolant temperature conditions.

For example, the spark ignition mode is always performed under a predetermined level of coolant temperature and the self-ignition mode can be performed above a predetermined level of coolant temperature, but even in this case, the self-ignition mode can be performed as long as the revolution number and the load conditions of the engine are within predetermined values.

Figure 6:
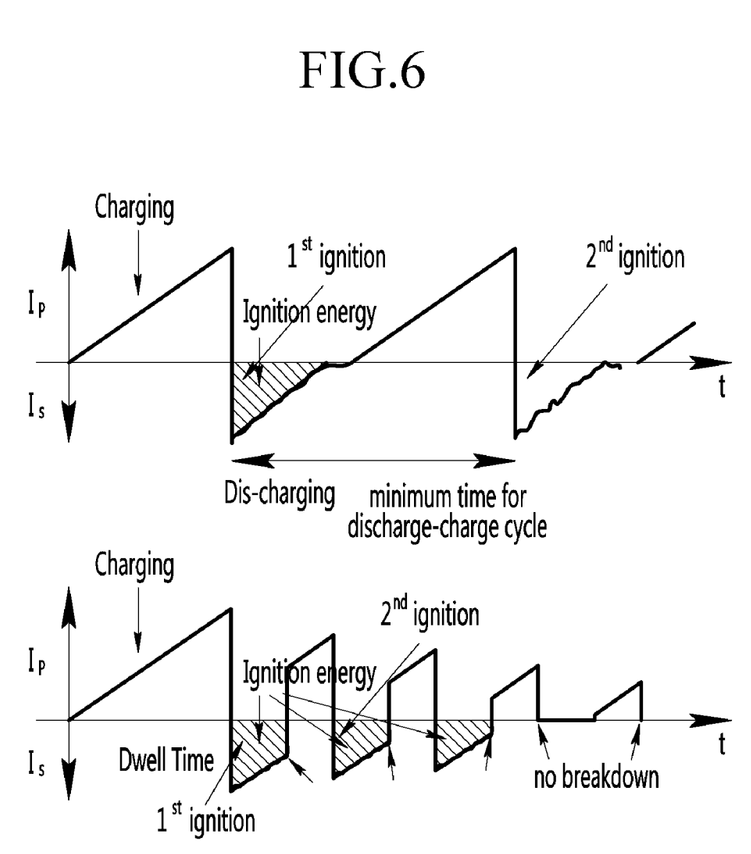
FIG. 6 is a graph of multiple ignition of an exemplary compression ignition gasoline engine according to the present invention.

Further, as shown in FIG. 6, it is basic to allow stable combustion by applying not the single ignition, but the multiple ignition (2-5 time ignition).

The multiple ignition requires several times of ignition for a short time in comparison to the single ignition, such that the combustion energy transferred to the gas mixture is different in accordance with the period and the number of each ignition. That is, in the single ignition, ignition is achieved by performing charging for a predetermined Dwell time to supply the ignition energy to the IG coil and then discharging to the spark plug, and the supplied energy is called the ignition energy.

The multiple ignition performs re-charging in the IG coil by clipping the ignition during the first ignition and then generates ignition by performing recharging to the spark plug.

In this case, the ignition clipping period can be controlled by the ECU and the charged energy reduces with the increase of the ignition number in common IG coils, such that although ignition is little generated in fourth or more time, the ignition energy considerably increases, as compared with the single injection.

It may be possible to maintain the ignition energy transferred to the gas mixture through the spark plug, even if the ignition number increases, by improving the response of the IG coil to reduce the charging time, in order to remove the defect in common IG coils.

The total ignition time should not excess six times, even in this cases.

This is because, the minimum charging time needs for the characteristics of the IG coil and the actual ignition time exists between BTDC 60° and BTDC 20° under compression TDC, such that when the ignition time delays, the ignition continues even after TDC, which may not help the combustion.

For convenience in explanation and accurate definition in the appended claims, the terms "up", "upper", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A compression ignition gasoline engine comprising:
   a combustion control device having an injector directly injecting fuel into a combustion chamber;
   a variable valve device changing a valve timing;
   at least two intake valves;
   at least two exhaust valves;
   a spark plug positioned at a central portion of the combustion chamber; and
   an injector positioned adjacent to the spark plug toward a center portion of the combustion chamber;
   wherein the exhaust valve has a symmetric valve lift in which the lift and the opening section of the at least two exhaust valves are the same in low lift, and
   the intake valve has an asymmetric valve lift in which the lift and the opening of the at least two intake valves are different in the low lift.

2. The compression ignition gasoline engine of claim 1, wherein:
   the at least two intake valves move by the same valve lift in a spark ignition mode in ignition for an explosion stroke with spark generated by the spark plug disposed in the combustion chamber, and
   one of the intake valves moves with less valve lift than the other intake valve in a self-ignition mode in which self-ignition for the explosion stroke is processed in the combustion chamber.

3. The compression ignition gasoline engine of claim 2, wherein:
   in the self-ignition mode,
   the lift start time of at least one of the at least two intake valves is later than the lift start time of the other of the at least two intake valves and the closing time of the intake valves is the same.

4. The compression ignition gasoline engine of claim 2, wherein:
   in the self-ignition mode, the lift maximum time of one of the at least two intake valves and the lift maximum time of the other of the at least two intake valves are the same.

5. The compression ignition gasoline engine of claim 2, wherein:
   the one of the at least two exhaust valves has less lift in the spark ignition mode than in the self-ignition mode.

6. The compression ignition gasoline engine of claim 5, wherein:
   the closing time of at least one of the at least two exhaust valves is earlier in the self-ignition mode than the spark ignition mode.

7. The compression ignition gasoline engine of claim 5, having a section in which at least one of the at least two intake valves opens after a predetermined time, with the exhaust valve closed in the self-ignition mode.

8. The compression ignition gasoline engine of claim 1, wherein:
   fuel is separately injected from the injector for several times, at least one time or more, in negative valve overlap, intake, and compression processes, in accordance with the operation region.

9. The compression ignition gasoline engine of claim 1, wherein:
   the spark plug reduces combustion noise by controlling the time of self-ignition due to the earlier flame propagation and restricting a combustion pressure ascension rate, with an ignition assist type using multiple ignition.

10. The compression ignition gasoline engine of claim 1, wherein:
    the injector is an outward type in which a pintle therein moves outside.

11. The compression ignition gasoline engine of claim 1, wherein:
    the valve timing is controlled by applying continuous variable valve timing to the intake and exhaust valves, thereby adjusting an EGR rate.

12. The compression ignition gasoline engine of claim 1, wherein:
    the piston has a recessed groove with a predetermined inclination at a center portion thereof for center direct injection.

13. The compression ignition gasoline engine of claim 12, wherein:

the recessed grove is a semicircular or flat groove with a predetermined inclination at a center portion thereof.

* * * * *